Aug. 17, 1965 R. E. ARSENEAU 3,201,524

MULTI-FREQUENCY TONE SIGNALING SYSTEM

Filed March 27, 1961

INVENTOR.
ROGER E. ARSENEAU
BY
ATTORNEY

3,201,524
MULTI-FREQUENCY TONE SIGNALING SYSTEM

Roger E. Arseneau, Chicago, Ill., assignor to International Telephone and Telegraph Corporation, New York, N.Y., a corporation of Maryland Filed Mar. 27, 1961, Ser. No. 98,363
7 Claims. (Cl. 179—84)

This invention relates generally to signaling systems and more particularly to multi-frequency tone signaling systems of the type used in automatic telephone systems.

The invention is particularly—although not exclusively—designed for use in an automatic telephone system such as that shown in a co-pending application for U.S. patent entitled "Electronic Switching Telephone System," Serial No. 837,400, filed September 1, 1959, now U.S. Patent No. 3,118,974, by Radcliffe and Pickering, and assigned to the assignee of this invention. That application discloses an electronic switching telephone system of a type which uses a combination of time and space switching techniques. That is, spaced apart switching devices are controlled during individual time frames to extend telephone calls between calling and called subscribers. An advantage of the time switching technique is that the cost of common control equipment is sharply reduced because it is shared by all of the controlled equipment. An advantage of the space switching technique is that both the quality and quantity of voice transmission depends only upon the characteristics of crosspoint components and, therefore, improves with the discovery or invention of new and improved components. Contrast this with other electronic switching systems which rely upon time division multiplexing where the limiting factor is the time rate at which each channel pulse must reappear to provide continuity of conversation. There the limiting factor is time which can never be increased and, therefore, limits the ultimate size and quality of switching systems regardless of the improvements in components.

Regardless of the techniques used in the electronic switching telephone systems, standard methods of signaling have been adopted by the telephone industry and must be followed if the systems are to be compatible with other telecommunication systems. Among these standards, are the frequencies used for controlling the switching systems which frequencies have come to be known by the following alphabetical designations:

| Designation of tone: | Frequency c.p.s. |
|---|---|
| S (Seizure) | 1700 |
| U | 1900 |
| V | 2100 |
| W | 2300 |
| X | 2500 |
| Y | 2700 |
| Z (Release) | 2900 |

Of these, the S tone frequency (1700 c.p.s.) indicates the closure of hookswitch contacts when handsets are removed from telephones, or briefly stated "off-hook supervision." Another of these, the YZ tone frequency (2700 c.p.s. mixed with 2900 c.p.s.) indicates when a handset is returned to its hookswitch, or briefly stated "on-hook supervisor."

Since on-hook and off-hook supervision mean different things at different times depending upon the progress of a call as it is extended through a switching system, it is necessary to interpret the meaning of signals according to the events which previously occurred during the extension of a call. For example, off-hook supervision may indicate either that a finder should seize a calling line or that a ring signal or ringing current should be tripped, i.e. removed from a called line. In like manner, on-hook supervision may indicate either that switching equipment is to be released or that a re-call condition exists—as when one jingles a hookswitch to indicate that an operator is being re-called, for example. On still other occasions (hereinafter called "call interlock") these tone frequencies may have special meanings. For example, the system may receive digital or other signals from a distant exchange and then return the same signals to be compared with information stored at the distant exchange. If the comparison indicates correct operation, an acknowledging signal, which may be the S tone, is returned from the distant exchange. Finally, the signal tones may occur in a random manner either as part of a voice signal or as noise. From the foregoing, it is apparent that the telephone equipment must interpret the meaning of the tone signals generally, and the S and YZ signals particularly, according to the time when they occur relative to the progress of a call as it is extended through an exchange. The above described events are cited by way of example only; those skilled in the art will readily perceive other events which could also control the interpretation of signals.

Traditionally, telephone equipment interprets the meaning of on-hook and off-hook supervision according to whether signals are received over talking conductors extended from the calling or the called party and whether the signals are received before or after switch-through. The result is that two distinct signal detectors are provided, one detector being connected to the talking conductors of the calling party and the other detector being connected to the talking conductors of the called party. Upon reflection, it is apparent that this is a duplication of equipment and that a substantial savings is possible if the two detectors are combined.

Accordingly, a general object of this invention is to provide a new and improved multi-frequency signaling system and a more particular object is to provide a signaling system for use in electronic telephone switching systems. In this connection, an object is to provide a tone detector which interprets the meaning of multi-frequency tones received over either calling or called lines according to the time at which they occur during the progress of a call as it is extended through an exchange. A more specific object is to reduce the number of components required to complete calls through multi-frequency tone controlled telephone systems.

Another object of this invention is to provide inexpensive signaling systems using standardized logic modules and low cost, commercially available transistors. In this connection, an object is to provide an inexpensive method of controlling such logic modules and transistors after the receipt of a predetermined number of multi-frequency tone signals.

In accordance with one aspect of this invention, calls are extended through an exchange in response to a number of tones or frequencies transmitted from a calling subscriber station to a series of filters, each tuned to one of the signaling frequencies. The connection between the subscriber station and the series of filters is completed via a signal path including other filters individually tuned to reject certain of the tone frequencies. Connected across each of these other filters in an electronic switch that is switched "on" to bypass the filters and allow passage of the corresponding frequencies at specific times during the extension of a call. In this manner, the meaning of a particular signal frequency is interpreted in accordance with its position in a series of signals and, therefore, in accordance with the progress of a call as it is extended through an exchange.

The above mentioned and other features and objects of this invention together with the manner of obtaining them will become more apparent and the invention itself will be best understood by making reference to the following description of an embodiment of the invention taken in conjunction with the accompanying drawings in which.

Figure 1:
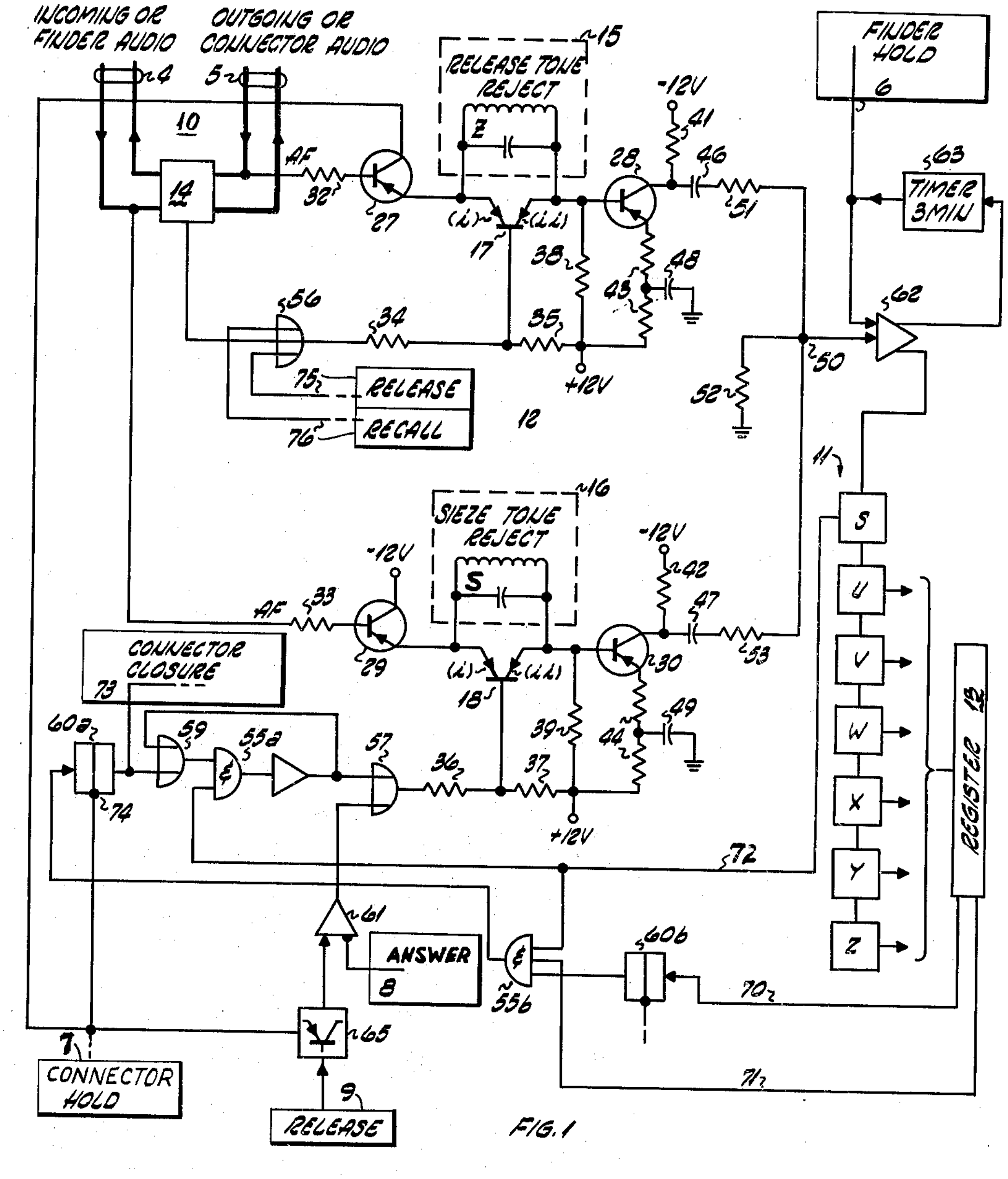
FIG. 1 shows by logic circuit diagram a portion of the signaling system.
Figure 2:
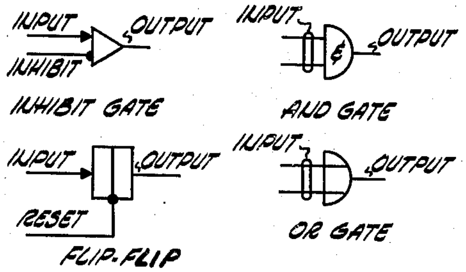
FIG. 2 shows the logic symbols used in FIG. 1.

The principles of a telephone system in which the invention was actually used are shown in the above identified Radcliffe-Pickering application. Only those portions of that system which are necessary for an understanding of the invention are shown herein. More specifically, the heavily inked "incoming or finder audio" conductors 4 extend to the telephone of a calling subscriber and are the same as the Radcliffe-Pickering conductors 422, 423; the "outgoing or connector audio" conductors 5 extend to the telephone of a called subscriber and are the same as conductors 424, 425; the "finder hold" and "connector hold" conductors 6, 7 extend to a crosspoint switch and are the same as conductors 261, 421; the "answer" conductor 8 is energized when a called party answers ("answer supervision") and is the same as the conductor extending between the Radcliffe-Pickering receiver 430 and the S filter 435; and, finally, the conductors extending to register 13 are those shown generally at 237–241 in the Radiclffe-Pickering application. The "release" conductor 9 is energized by a timer for a period of three minutes after finder operation and from a link circuit after the receipt of answer supervision and for the duration of a call. Thus, the potential on conductor 9 is removed only if the call is not completed within three minutes or if a link signals switch release at the end of a call.

The principal components of the signaling system shown in the attached drawings are a talking circuit 10, a number of filters 11 for selecting between tone frequencies, and a signal path 12 for intercoupling the talking conductors and the tone selecting filters. The talking circuit 10, which is considered to be a source of tone signals, includes the finder and connector audio conductors 4, 5 and a switch-through network 14 for selectively completing the talking circuit responsive to the receipt of answer supervision. Each of the filters 11 is tuned to pass a corresponding one of the tone frequencies, as indicated by the letters S and U–Z. These frequencies are then transmitted to register 13 which actually provides the signals that command the switch operations of the automatic telephone system.

The signal path 12 intercoupling the talking circuit 10 and the filters 11 includes a number of filters tuned to the frequencies of particular ones of the tones. Two of these filters are shown at 15, 16 as anti-resonant, parallel inductance-capacitance circuits tuned to reject specific frequencies; however, other types of filters may be used also. For example, the filter 15 rejects tones of the Z frequency and the filter 16 rejects tones of the S frequency. It should be obvious that these particular frequencies are exemplary and that other frequencies or bands of frequencies may be accommodated also.

To control the insertion or removal of these filters in the signal path 12, electronic switch means (here shown in the form of bilateral transistors 17, 18) is individually associated with each filter. A characteristic of bilateral transistors which make them particularly desirable for uses such as this is that, when switched "off," there is an extremely high resistance between the input and output electrodes [which are the emitter-collectors (i), (ii), respectively]. When the transistors are switched "on," there is an extremely low resistance between these electrodes. Therefore, since each of the filters 15, 16 is connected between the input and output electrodes (i), (ii) of its associated switch, current must flow through the filters when the electronic switches 17, 18 are turned "off," and virtually no current flows through the filters when the switches are turned "on" to provide a low resistance shunt or bypass.

The meanings of the tone signals are, therefore, interpreted by whether the electronic switches are turned "off" or "on." That is, if the Z tone frequencies appear at a time when the switch train should not be released, the transistor 17 is turned "off" and the Z frequencies are rejected by the filter 15. On the other hand, at times when a switch train may be released, the transistor 17 is switched "on" and all frequencies appearing on the connector conductors 5 are transmitted to the filters 11 so that the Z tone frequencies have effect to cause switch train release. The effect is the same at the filter 16. The S tone frequencies are rejected when the transistor 18 is turned "off" and transmitted to the filters 11 when the transistor 18 is switched "on."

The remaining components in the signal path 12 include a pair of low cost, commercially available transistors 27, 28 and 29, 30 associated with the filters 15, 16, respectively. These transistors are audio frequency amplifiers coupled in common emitter configuration to amplify the tone frequencies as they appear in the talking circuit 10. A pair of current limiting resistors 32, 33 interconnect the base or control electrodes of the transistors 27, 29 respectively and the talking circuit 10. The base bias for transistors 17, 18 is provided by voltage dividers 34, 35 and 36, 37, respectively. The resistors 38, 39 are the load and supply the emitter-collectors (ii) from a (+)12 volt battery. Resistors 41, 42 are the collector load resistors and resistors 43, 44 are the emitter bias resistors for the transistors 28, 30, respectively. The capacitors 46, 47 are coupling capacitors and the capacitors 48, 49 bypass a portion of the emitter resistors 43, 44 to control the amount of negative feedback caused by the fluctuations in the emitter-collector current of the transistors 28, 30. The output signal of the signal path 12 appearing at output terminal 50 is taken from a pair of voltage dividers which include the resistors 51, 52 and 52, 53.

The circuit values are chosen so that the transistors 27–30 conduct when signal tone frequencies appear in the talking circuit. The transistors 17, 18 are switched "off" unless a negative potential is applied to the left-hand ends of the voltage dividers 34, 35 or 36, 37.

With the foregoing description of the circuit components in mind, it is thought that the nature of the invention will be understood best from the following description of the manner in which the circuit operates as a call is extended from a calling subscriber station (not shown) through a switching network to the finder audio conductors 4 of a link circuit and thereafter from that same link circuit over the connector audio conductors 5 to a called subscriber station (not shown).

As here shown, the pertinent parts of the link circuit include "AND" gates shown by semi-circles 55*a* and *b* including an ampersand and having a pair of input conductors touching its chord. An "AND" gate, such as this conducts only when all of its input conductors are energized simultaneously. Also included in the link circuit are three "OR" gates 56–59, each of which conducts when any of the input conductors which intersect its chord is energized. Flip-flip memory circuits 60*a* and *b* are shown by a rectangle including a bisecting line. If the input conductor (marked by an arrowhead) is energized, a signal appears at the opposite side of the rectangle or on the output conductor. On the other hand, if the reset terminal (marked by a heavily inked dot) is energized, the signal is removed from the output conductor. Finally, the link circuit includes an "inhibit" gate, here shown by an amplifier 61, having one input terminal (marked by an arrowhead) and an inhibit terminal (marked by a heavily inked dot). If this inhibit terminal is energized, the amplifier cannot conduct. Otherwise, the amplifier conducts any signals appearing at the input to the opposite or output conductor.

*Seizure.*—When a calling subscriber removes a receiver or handset from a telephone set, an associated hookswitch combination closes to transmit S tone. Responsive thereto, a line circuit operates to close a finder crosspoint in the manner explained in the above identified Radcliffe-Pickering application. After the finder crosspoint closes, a potential is applied from the crosspoint to the finder hold conductor 6 and transmitted through an amplifier 62 having a pair of electrically isolated output terminals. The upper of these output terminals is connected to trigger a three-minute timer 63 and the lower terminal is connected to the filters 11.

For the three-minute period immediately following the closure of the finder crosspoint, the timer 63 measures time but does not provide an output signal. If the call is completed before the end of the three-minute period, the finder crosspoint is held by other equipment in the link. If the call is not so completed, the crosspoint is released when the timer 63 applies a release potential to conductor 6. This is to prevent an off-hook telephone or shorted loop from indefinitely tieing up a finder network.

The transistor device 65, amplifier 61, and "OR" gate 57 conduct to cause transistor 18 to switch "on." After the transistor 18 switches "on," the band-reject filter 16 is effectively bypassed and, therefore, any S tone frequencies appearing on the finder audio conductors 4 are transmitted through the emitter-collector circuits (i), (ii) of transistor 18 to the filters 11. Also, after the transistor 18 switches "on," the (+)12 volt battery connected to the resistor 39 furnishes the emitter bias for the transistor 29.

The circuit is now standing ready to receive any digit pulses transmitted as tone frequencies from the calling subscriber station to the signal circuit shown in the drawing via the finder conductors 4.

*Dialing.*—Means are provided for selecting between the tones transmitted over the finder conductors. More particularly, as each signal or tone frequency appears, it is amplified at transistor 29 and transmitted through the emitter-collectors (i), (ii) of transistor 18 to the base of the transistor 30. Another amplification occurs and the reamplified signal appearing at the collector of the transistor 30 is applied to the output terminal 50 via the capacitor 47 and the resistor 53. The output signal at 50 is transmitted through the amplifier 62 to the filters 11 where the selection between the tones actually occurs. Thus, if a U frequency tone is received, the U filter in group 11 transmits a signal to the register 13; if a V frequency tone is received, the V filter transmits a signal to the register 13, etc. The register includes any well known means for converting the tone signals into the signals which actually control the operation of crosspoints in a connector matrix. It should be noted that the S tone frequencies are effective if received at this time because filter 16 is bypassed through the conductive transistor 18.

Means are provided for inserting the filter 16 into the signal path 12 after a predetermined number of the tone signals are received. That is, when the crosspoint in the connector matrix operates, means are provided for originating a supervisory potential such as a negative potential, the negative potential is returned over the connector hold conductor 7 to bias an electrode of the transistor device 65 to a cut-off condition and thereby terminate the flow of current through the amplifier 61 and the "OR" gate 57. Thus, the transistor 18 turns "off" to insert the filter 16 by removing the shunting bypass around it. Any further signals appearing on the finder conductors 4 are transmitted through the filter 16; therefore, if S tone frequencies should appear, they are blocked by the filter 16 and not allowed to reach the S filter 11.

An advantage of this arrangement is that the meaning of the S tone frequency is interpreted according to its position in a series of tones or, stated another way, according to the time at which it appears during the extension of a call through a telephone exchange. More specifically, if the S tone frequency is received over the conductors 4 before the connector crosspoint operates, it is effective because it passes through the transistor 18 to the filters 11. On the other hand, if the S tone frequency is received over the conductors 4 after the connector crosspoint operates, there is no effect; the filter 16 rejects the tone and it does not reach the filters 11.

*Answer supervision.*—In carrying out this invention, if received after operation of a connector crosspoint, the S tone frequency trips ringing current. That is, when the call is answered, this tone is transmitted from the hookswitch contacts of the called subscriber station over the connector conductors 5 to the base of the transistor 27. The S tone is then transmitted through the transistors 27, 17, 28, and amplifier 62 to the filters 11 and on to the link. Then the link operates the switch-through device 14 and a negative potential is transmitted through the "OR" gate 56 to the left-hand terminal of the voltage divider including the resistors 34, 35. The potential appearing at the base of the transistor 17 holds it in an "on" condition, thus maintaining the bypass around the filter 15.

Also responsive to the receipt of answer supervision, the answer conductor 18 is energized to inhibit the amplifier 61 and thus prevent the transistor 18 from again turning "on." Thereafter, S tones received over the finder conductor 4 have no effect.

The Z tone filter 15 is provided for the condition when the telephone of the called party is off-hook, but not busy. Under these conditions, the link sends ringing current to this off-hook telephone and the called party must first place the handset on-hook and then remove the handset from the hook to answer the call. In doing so the hookswitch contacts send release tone YZ before the answering tone S. Here, the Z filter 15 rejects the Z component of the YZ tone so that the call is not released when the handset is replaced before ring trip. After the handset is again lifted off-hook, S tone is sent to trip ringing, switch "on" transistor 17, and short the Z filter 15. Thereafter receipt of a Z tone releases the link.

As an aside, it may be interesting to note that the telephone system in which the invention is actually used is a first party release system. Therefore, if either party hangs-up, the switching equipment releases and both subscriber lines are immediately marked idle. If a call is extended to the off-hook station before the subscriber hangs-up, ringing current causes an audible signal in the receiver of the off-hook station, and the called party may answer. Also, if a handset is improperly left off-hook, the system times out and the off-hook line is released. Again switching equipment is released, the off-hook line is marked idle, and on calls to the off-hook station the ringing current causes an audible signal in the receiver.

*Release.*—The circuit remains in the described condition until the conversation is completed, at which time both subscribers return their handsets to the associated telephone set whereupon hookswitch contacts (not shown) close to transmit the YZ tone frequency over the talking circuit 10. Before the connector crosspoint closes and the transistor 17 switches "on," the YZ tone cannot reach the register from the connector conductors. After the ringing current is tripped and the transistor 17 switches "on," the YZ tone received over the conductors 5 is transmitted to the filters 11, thus causing crosspoint release. An appearance of the YZ tone on the finder conductors 4 is always effective.

*Interlocking call.*—Next to be described is the manner in which the call interlock circuit operates. An interlocking call is defined herein as one received from a distant exchange which seizes the local exchange (shown in the drawing) and the finder conductors 4 via a trunk circuit (not shown). During the extension of the interlocking call, each step in the switching process is checked to verify proper circuit operation. To accomplish this, the local office transmits various tones to the distant exchange where they are compared with stored information. If this comparison indicates correct operation, the distant exchange returns S tone and the local office transmits the next tones to the distant office for comparison. On the other hand, if the comparison indicates incorrect operation, the distant exchange returns release tone, the call is released, and a new call is placed. Thus, during the extension of an interlocking call, S tone may be received many times. Therefore, means must be provided for interpreting the meaning of the S tones if their second appearance is not to be treated as answer supervision.

The principal components of the call interlocking circuit are a number of memory or flip-flip circuits 60*a*, 60*b* and a number of "AND" gates 55*a*, 55*b*. The memory circuits are driven from the register via the conductors 70, 71 and the "AND" gates are energized jointly from the memory circuits and from the S tone filter.

The interlock circuit operates this way. The distant office transmits S tone via a trunk circuit (not shown) to operate a finder crosspoint in the same manner that local off-hook supervision operates a crosspoint. Then, the distant office transmits a request for an interlocking call, which request may be a combination of V and Z tones, for example. The register stores these tones and, responsive thereto, triggers the flip-flip 60*b* via the conductor 70. Also, the register returns V and Z tones to the distant office in any convenient manner. The distant office recognizes this returned V and Z tone as an indication that the local office functioned properly. Upon such recognition, the distant office returns S tone which causes the S filter 11 to energize conductor 72 and the upper input terminal of "AND" gate 55*b*. The lower input is energized by flip-flip 60*b* and, if a correct digit is stored in the register, the middle input is energized via conductor 71. Thus, a signal is transmitted through "AND" gate 55*b* to trigger the memory circuit or flip-flip 60*a* which turns "on" to close a connector crosspoint via conductor 73. Flip-flip 60*a* stays on until the connector crosspoint closes to mark the connector hold conductor 7 and, therefore, pulse the flip-flip reset terminal 74. The distant office, however, maintains control over the signal circuit because the output of "AND" gate 55*a* is fed back through "OR" gate 59 to replace the output of the flip-flip 60*a* after the crosspoint closes. Thus, "AND" gate 55*a* continues to conduct until the S tone is removed from its lower input by the distant office. When "AND" gate 55*a* ceases to conduct, the negative potential is removed from the left-hand terminal of the voltage divider 36, 37. Since the connector crosspoint has closed, device 65 is no longer conducting and transistor 18 turns "off." Thereafter the circuit responds to answer supervision in a conventional manner.

The foregoing description of an interlocking call has assumed that three S tone signals are received: one to operate a finder, one to operate flip-flip 60*a*, and one to trip ringing. If additional S tone signals are received, additional flip-flips are provided.

In addition to the foregoing operations, provisions may be made to control a filter insertion responsive to special conditions. To illustrate the point, the transistor 17 is shown in association with release and re-call conductors 75, 76. If there are special reasons why a circuit should be released, the link circuit energizes the release conductor 75 to switch "on" the transistor 17. Also during re-call when it is necessary to send seize and release signals alternately (as when a subscriber jiggles a hookswitch, for example) the re-call conductor 76 is energized to switch "on" the transistor 17.

An advantage of this invention is that a single signal detector system serves both the finder and connector sides of the talking circuit. Thus, there is a substantial reduction in the number of parts required to complete calls through switching equipment. Moreover, this function is accomplished through the use of standardized logic modules (such as "AND" gates, "OR" gates, and flip-flips) and does not require high cost, specially designed circuits. Finally, the circuits are not required to operate under marginal conditions; therefore, low cost, commercially available transistors may be used throughout. Quite obviously, other advantages will be apparent to those skilled in the art.

It is to be understood that the foregoing description of a specific embodiment of the invention is not to be construed as a limitation upon its scope.

1. A signaling system for use in an automatic telephone switching system that provides supervisory potentials indicating the progress of a call through the switching system during the connection of called and calling lines comprising means for transmitting switch directing signals over talking circuits in the system, said signals appearing in the form of a plurality of multifrequency tones, means for selecting between the signal frequencies transmitted through said system and converting them into the signals which actually command the operation of the switching system means in said switching system for providing answer supervisory tones to indicate an answer condition in said called lines, means for completing the talking circuits through said system responsive to the receipt of answer supervision, means comprising at least one filter means tuned to the frequency of at least one of said tones for providing a signaling path for intercoupling said frequency selecting means and said talking circuit, and switch means individually associated with said filter for selectively controlling the insertion of said filter responsive to the supervisory potentials and removal of said filter in the signaling path responsive to the occurrence of said answer supervision.

2. A signaling system comprising a source of tone signals, said signals being distinguished by the frequency thereof and appearing as a series of sequentially applied tones means in said system for repeating certain of said frequencies in said series, a plurality of filter means for separating said signals by frequency, means for intercoupling said source and said separating means via a path including at least one band rejection filter tuned to reject the frequency of at least one of said tones, electronic switch means coupled to bypass said band rejection filter when switched on, and means for selectively switching off said switch means to enable said band rejection filter and for switching on said switch means to eliminate said filter responsive to the position of said ceratin frequencies in said series.

3. A signaling system comprising a talking circuit, means for selectively completing said talking circuit in response to a series of multifrequency tone components received over said talking circuit means for providing a plurality of supervisory potentials indicating the progress of the completion of said talking circuit, means for separating said tone components by frequency as they are received over said talking circuit, means for intercoupling said talking circuit and said separating means via a signal path including at least one filter tuned to reject at least one of said tone frequencies, and means for selectively controlling the insertion of said filter in said path responsive to said supervisory potentials provided during the completion of said talking circuit prior to the time when said one tone is received.

4. The signaling system of claim 3 wherein said filter insertion means comprises a bilateral transistor having said filter connected between the emitter-collectors thereof, and means for selectively switching said transistor off and on in response to supervisory potential provided during the completion of said talking circuit.

5. A signaling system for use in an automatic telephone switching system that provides supervisory potentials indicating the progress of a call through the switching system comprising means for transmitting switch directing signals requiring interlocking control over said system, said signals appearing in the form of a plurality of multi-frequency tones, at least one of said tone frequencies being transmitted repeatedly to provide said interlocking control, a plurality of filters tuned to said signal frequencies for controlling the extension of calls through said telephone system, means comprising a signal path for applying said tones to said tuned filters, said last named means comprising at least one other filter tuned to the frequency of said one tone frequency, switch means individually associated with said other filter for selectively controlling the insertion or removal of said other filter in said signal path, and means comprising memory circuits operated by each occurrence of said one tone frequency for operating said switch means responsive to said supervisory potentials occurring during the extension of said talking circuits.

6. A signaling system for use in an automatic telephone switching system that provides supervisory potentials indicating the progress of a call through the switching system, means for transmitting switch directing signals through said system via talking circuits, said signals appearing in the form of a plurality of multi-frequency tones, a plurality of bandpass filters tuned to said signal frequencies, means for intercoupling said talking circuits with said plurality of bandpass filters for controlling the extension of said talking circuits through said telephone system, said means for intercoupling comprising at least one band reject filter tuned to reject the frequency of at least one of said frequencies, and switch means individually associated with said band reject filter for selectively controlling the insertion or removal of said band reject filter in said means for intercoupling responsive to said supervisory potentials.

7. A signaling system for use in an automatic telephone switching system that provides supervisory potentials indicating the progress of a call through the switching system during connection of calling and called lines comprising means for transmitting switch directing signals through said system via talking circuits, said signals appearing in the form of a plurality of multi-frequency tones, bandpass filter means for selecting between the signal frequencies to control the extension of said talking circuits through said system, means for interconnecting said talking circuits and said bandpass filter means via a signaling path, said means for interconnecting including band reject filter means tuned to the frequency of at least one of said tones, means in said switching system for providing answer supervisory tones to indicate an answer condition in said called lines, filter insertion means comprising an electronic switching device having input and output electrodes, said band reject filter means being connected between the input and output electrodes, means for selectively completing a selected one of said talking circuits in response to the receipt of said answer supervision, and means for selectively switching the electronic device off and on to control the insertion and removal of said band reject filter means in said signaling path responsive to supervisory potentials occurring as a function of whether or not answer supervision has occurred.

References Cited by the Examiner

UNITED STATES PATENTS

| | | | |
|---|---|---|---|
| 2,364,685 | 12/44 | Baker | 343—226 |
| 2,600,405 | 6/52 | Hoeppner | 340—171 |
| 2,739,298 | 3/56 | Lovell | 179—16 |
| 2,883,474 | 4/59 | Fritschi | 179—84 |
| 2,935,572 | 5/60 | Hastings et al. | 179—84 |
| 3,022,493 | 2/62 | Tschumi et al. | 340—171 |
| 3,060,275 | 10/62 | Meacham et al. | 179—84 |
| 3,076,059 | 1/63 | Meacham et al. | 179—84 |

ROBERT H. ROSE, *Primary Examiner.*

WALTER L. LYNDE, L. MILLER ANDRUS, *Examiners.*